Patented Mar. 10, 1953

2,631,143

UNITED STATES PATENT OFFICE 2,631,143

PURIFICATION OF ANTIBIOTICS WITH WATER SOLUBLE SALTS OF WATER INSOLUBLE CARBOXYLIC ACIDS

William Braker, Newark, William A. Lott, Maplewood, and Andrew Ellis O'Keeffe, Woodbridge, N. J., assignors, by mesne assignments, to Mathieson Chemical Corporation, Baltimore, Md., a corporation of Virginia No Drawing. Application July 19, 1947, Serial No. 762,206

18 Claims. (Cl. 260—210)

This invention relates to basic antibiotics of the streptomycin type, i. e., to members of the genus composed of streptomycin and antibiotically-active basic compounds which (like streptomycin) are capable of forming water-soluble salts with acids such as sulfuric and water-insoluble salts with organic-base-precipitating reagents (e. g., derivatives of streptomycin, such as dihydrostreptomycin and similarly-acting antibiotics, such as streptothricin).

In 1944, Schatz, Bugie, and Waksman (Proc. Soc. Exp. Biol. Med. 1944, 57, 244) showed that a potent antibiotic, termed "streptomycin," was formed during the growth of the organism *Actinomyces griseus* (now called *Streptomyces griseus*); and this antibiotic has since been demonstrated to be of high clinical utility.

It was later found that a number of streptomycins are formed at the same time. The first streptomycin obtained in pure crystalline form (as a reineckate) and fully characterized (Wintersteiner and Fried application, Serial No. 666,541, filed May 1, 1946) is now referred to as "streptomycin A"; and the second streptomycin characterized (Fried and Titus application Serial No. 737,400, filed March 26, 1947) is now referred to as "streptomycin B." Moreover, there are indications that still other streptomycins are formed at the same time and/or may be formed at the same time by changes in the culture conditions; and it is intended that each of such antibiotics and any mixtures thereof (whether in the form of the free base or water-soluble salt thereof) be comprehended by the term "streptomycin" when employed unmodified hereinafter in the specification and claims.

Streptomycin has been purified heretofore by various methods, all of which were complex and/or inefficient (and consequently expensive). For example, a method widely employed prior to this invention essentially comprised the following steps: (1) treating a primary streptomycin-containing liquid with an activated charcoal, which selectively adsorbs the streptomycin; (2) eluting the streptomycin from the charcoal with an aqueous, water-soluble mineral acid, preferably at a slightly elevated temperature (say about 30–50° C.); (3) treating the eluate with an organic-base precipitating reagent, preferably phosphotungstic acid; and (4) decomposing the precipitate. [The term "primary streptomycin-containing liquid" comprehends, inter alia: (a) the culture liquid obtained by growing *Streptomyces griseus* under conditions and in a medium suitable for the production of streptomycin, and removing the solids from the medium; (b) the culture liquid of enhanced potency obtained by acidification of such culture (with hydrochloric or sulfuric acid, for example), such liquid being neutralized; and (c) the liquid obtained by acid-extraction of the solids separated from such culture, such liquid being neutralized.]

It is the object of this invention to provide simple, efficient, and otherwise advantageous methods of purifying basic antibiotics of the streptomycin type—especially streptomycin; and it is a further object of this invention to provide methods of preparing certain salt-type derivatives of basic antibiotics of the streptomycin type.

The methods of this invention essentially comprise interacting a basic antibiotic of the streptomycin-type (especially streptomycin) with a water-soluble salt of a substantially water-insoluble carboxylic acid (preferably with a water-soluble alkali salt—which term is to be understood herein as embracing ammonium salt—of a higher fatty acid) in a solvent for the reactants (especially water). The formed salt-type combination of the antibiotic and the carboxylic acid is relatively insoluble in water, and precipitates as formed when water is employed as the solvent for the reactants. When the employed solvent for the reactants is one (such as methanol) in which the salt-type combination is soluble, the formed salt-type combination is recovered by removing the solvent or adding a miscible non-solvent for the salt-type combination (such as water). The purification methods of this invention essentially comprise treating an impure basic antibiotic of the streptomycin type with a water-soluble salt of a substantially water-insoluble carboxylic acid in a solvent for the reactants, recovering the formed salt-type combination of the antibiotic and the carboxylic acid, and converting the latter combination into a water-soluble salt of the antibiotic. Such conversion may be effected, for example, by dissolving the salt-type derivative in a substantially water-immiscible organic solvent for the carboxylic acid, intimately contacting the organic solvent solution with an aqueous, water-soluble, relatively-strong acid (especially with an aqueous, water-soluble, relatively-strong mineral acid), and recovering the aqueous phase; the salt recovered from the aqueous solution thus obtained being considerably purer.

The water-soluble salts of substantially water-insoluble carboxylic acids utilizable in the practice of this invention include the alkali-metal (which term is to be understood herein as embracing ammonium) salts of the following acids, inter alia: aliphatic acids, such as lauric, 2-ethyl-hexoic, sorbic, caprylic, palmitic, and oleic acids—especially coconut-oil fatty acids, palm-kernel fatty acids, or other technical lauric acid (i. e., mixture of fatty acids having an average molecular weight approximating that of lauric acid); aromatic acids, such as benzoic, phenyl-acetic, p-amino-benzoic, 3,5-dinitro-benzoic, cinnamic, and α-decyl-cinnamic; cycloaliphatic acids, such as camphoric and naphthenic; and heterocyclic acids, such as indoleacetic and furoic.

The substantially water-immiscible organic solvents for substantially water-insoluble carboxylic acids utilizable in the practice of this invention include, inter alia: aliphatic alcohols, such as n-amyl alcohol (1-pentanol), n-butanol (1-butanol), methyl-isopropyl carbinol, methyl-isobutyl carbinol, isobutyl carbinol, 2-ethyl-hexanol, and alcohol mixtures, such as refined fermentation-amyl-alcohol or a commercial mixture of synthetic amyl alcohols (e. g., Pentasol); aliphatic alcohol esters of lower fatty acids, such as the acetate of methyl-isobutyl carbinol; aliphatic ketones, such as methyl-isobutyl ketone; aliphatic ethers, such as di-n-butyl ether and diethyl ether; hydrocarbons, such as benzene and toluene; and halogenated hydrocarbons, such as chloroform and ethylene dichloride.

Among the water-soluble, relatively-strong acids utilizable in the practice of this invention are sulfuric, hydrochloric, tartaric, phosphoric, oxalic, and citric.

In one embodiment of the invention, a culture filtrate containing a basic antibiotic of the streptomycin type is mixed with an aqueous solution of a water-soluble salt of a substantially water-insoluble carboxylic acid, and the precipitate formed is recovered and converted into a water-soluble salt of the antibiotic. Alternatively, the water-soluble salt of the substantially water-insoluble carboxylic acid may be added to the culture filtrate (or other solution of the basic antibiotic of the streptomycin type in a solvent for the reactants) in solid form; or both the antibiotic and the carboxylic acid salt may be added in solid form to a solvent for the reactants.

Preferably, especially when the solution of the antibiotic treated is a culture filtrate, the precipitate obtained is washed with water before further treatment, the wash removing a considerable amount of inactive solids but practically none of the antibiotic.

The precipitation of the salt-type combination of the antibiotic and the carboxylic acid is dependent on the concentration of the reactants and the pH of the reaction medium. Maximum precipitation is obtained when the concentrations of the antibiotic and/or the water-soluble carboxylic acid salt in the reaction medium are high and the pH of the reaction mixture is between about 6.0 and about 8.0, and preferably around 7.0.

Alternatively, the salt-type combination of the antibiotic and the carboxylic acid formed may be used as a therapeutic agent per se. These salt-type derivatives of the antibiotics are, in general, oil-soluble or oil-dispersible; and they may be orally administered either per se or in oily media for the treatment of intestinal disorders (relying on intestinal processes to liberate the antibiotic in water-soluble form), or parenterally administered in oil media for prolonged antibiotic action. Where production of the salt-type combination of the antibiotic and the substantially water-insoluble carboxylic acid, rather than purification of the antibiotic, is the objective, one may employ a reconstituted solution of the antibiotic (e. g., an aqueous solution of the highly-purified or pure antibiotic).

The amount of carboxylic acid salt employed should desirably be sufficient to interact with all of the antibiotic in the solution treated, and preferably should be in excess.

The precipitated salt-type combination of the antibiotic and the carboxylic acid may be further treated as follows (whether it is to be used as a therapeutic agent per se or converted into a water-soluble salt): the precipitated salt-type derivative is dissolved in a suitable solvent, e. g., tertiary butanol, and freeze-dried (i. e., frozen, and subjected to a high vacuum to sublime off the solvent); preferably, the precipitated salt-type derivative is first washed with water, dissolved in tertiary butanol (for example), precipitated from the solution (by addition of acetone, or other non-solvent for the salt-type derivative which is miscible with the tertiary butanol), redissolved in tertiary butanol, and freeze-dried.

The following examples are illustrative of the invention (all solutions or dilutions referred to without identification of the solvent or diluent being solutions in, or dilutions with, water):

*Example 1*

(a) 15.5 g. streptomycin hydrochloride, having a potency of 528 units/mg., is dissolved in 400 ml. water, and the solution is adjusted to pH 7 by addition of sodium hydroxide solution; to this solution is added a solution of sodium laurate prepared by digesting 39.52 g. lauric acid with 33.9 ml. 5.8 N sodium hydroxide solution; and the curdy precipitate formed is separated by centrifugation.

(b) The precipitate (a salt-type combination of streptomycin and lauric acid) is washed with water, and dissolved in tertiary butanol; the salt-type derivative is then reprecipitated by addition of acetone, and redissolved in tertiary butanol; and the solution is freeze-dried, yielding about 8.3 g. of the substantially-pure salt-type derivative having a potency of 290 units/mg. The salt-type derivative may be used as a therapeutic agent per se, or converted into a water-soluble salt of streptomycin, e. g., as described in section (b) of the following example.

*Example 2*

(a) A streptomycin-containing culture filtrate (obtained, for example, by growing *Streptomyceus griseus* in submerged culture in an aqueous medium containing soybean meal, dextrose, and sodium chloride, acidifying the incubated culture, and filtering), having a potency of 400 units/ml. and a total activity of 8.2 million units, is treated in the same way as the streptomycin hydrochloride solution described in section (a) of the preceding example.

(b) The separated precipitate is dissolved in 300 ml. refined fermentation-amyl-alcohol, and the solution is washed four times, each time with one-fourth its volume distilled water; the washed amyl alcohol solution is then extracted with one-fourth its volume of third-normal sulfuric acid, and then with two portions of distilled water, each one-fourth the volume of the amyl alcohol solution; the three extracts are combined and washed with one-fourth their combined volume of fresh amyl alcohol (to remove any entrained lauric acid); and the washed extract is separately treated with three portions of an adsorbent carbon (e. g., Darco G-60), 0.5 g. carbon per million units streptomycin in the extract being used for each portion. The extract is adjusted to pH 5.5-6.0 by addition of barium hydroxide solution; and after standing several hours, the extract is filtered to remove precipitated barium sulfate, partially concentrated at low temperature in vacuo, and freeze-dried. The streptomycin sulfate thus obtained has a potency of about 400 units/mg.

*Example 3*

(a) 36.33 g. streptomycin sulfate having a potency of 544 units/mg. is dissolved in 988 ml. water, and the solution is adjusted to pH 7 with aqueous sodium hydroxide solution; to this solution is added a solution of sodium laurate prepared as described in section (a) of Example 1; and the curdy precipitate formed is separated by centrifugation.

(b) The precipitate (a salt-type combination of streptomycin and lauric acid) is treated as described in section (b) of Example 1, yielding about 21.0 g. of the substantially-pure salt-type derivative having a potency of 320 units/mg.

*Example 4*

(a) 200 ml. of a streptomycin-containing culture filtrate, having a potency of 400 units/ml., is adjusted to pH 7.15 by addition of sodium hydroxide solution; a concentrated aqueous solution of sodium laurate (prepared by warming equivalent quantities of sodium hydroxide solution and lauric acid) is added, in the proportion of 10 g. lauric acid per g. streptomycin base; and the mixture is agitated for a half hour and then centrifuged. The semi-solid product obtained (a salt-type combination of streptomycin and lauric acid) contains about 60.5% of the activity of the culture filtrate.

Sodium laurate in the proportions of 5 g. and 15 g. lauric acid per g. streptomycin base precipitates respectively about 12.2% and 33.4% of the culture filtrate activity.

(b) The salt-type derivative of streptomycin may be purified as described in section (b) of Example 1 and/or used as a therapeutic per se, or converted into a water-soluble salt of streptomycin, e. g., as described in section (b) of Example 2.

*Example 5*

(a) 1 g. dihydrostreptomycin sulfate, having a potency of 531 units/mg., is dissolved in 25 ml. water, and the solution is adjusted to pH 7 by addition of 10% sodium hydroxide solution; to this solution is added 25 ml. of sodium laurate solution, prepared by treating 39.5 g. coconut-oil fatty acids with 34 ml. of 20% sodium hydroxide solution and diluting to 200 ml. with water; and the precipitate formed is separated by centrifugation.

(b) The precipitate (a salt-type combination of dihydrostreptomycin and coconut-oil fatty acids) is washed with water, and dissolved in tertiary butanol; the salt-type derivative is then reprecipitated by addition of acetone, and the precipitate is redissolved in tertiary butanol; and the solution is freeze-dried, yielding about 160 mg. of the substantially-pure salt-type derivative having a potency of about 74 units/mg. and a nitrogen content of about 5.41%. It may be used as a therapeutic agent per se, or converted into a water-soluble salt of dihydro-streptomycin, e. g., as described in section (b) of Example 2.

The supernate remaining on separation of the acetone-formed precipitate gives a further precipitate on standing in the cold, which is separated and dissolved in tertiary butanol; and the solution is freeze-dried, yielding about 380 mg. additional salt-type derivative having a potency of about 55 units/mg. and a nitrogen content of about 2.31%.

The lauric acid and coconut-oil fatty acids employed in the foregoing examples may be replaced by any other of the hereinbefore-mentioned substantially water-insoluble carboxylic acids; the refined fermentation-amyl-alcohol used in Example 2 may be replaced by any other of the hereinbefore-mentioned substantially water-immiscible organic solvents for substantially water-insoluble carboxylic acids; and the sulfuric acid employed in Example 2 may be replaced by any other of the hereinbefore-mentioned water-soluble, relatively-strong acids.

Instead of the antibiotic solutions treated in the foregoing examples, one may treat a streptomycin-containing eluate (e. g., one having a potency of 556 units/ml., obtained by treating a primary streptomycin-containing liquid with an activated charcoal and eluting the streptomycin from the charcoal with dilute hydrochloric acid), or a streptothricin hydrochloride solution, inter alia. Also, one can treat a solution of one of the following pure or substantially-pure basic antibiotics of the streptomycin type: streptomycin A, streptomycin B, dihydrostreptomycin A, and dihydrostreptomycin B.

The basic antibiotic of the streptomycin type purified by the method of this invention may be further purified by repetition of the purification method of this invention. Also, it may be preliminarily purified or further purified by any other method, especially by one of the following: (I) intimately contacting an aqueous solution of the antibiotic with a substantially water-insoluble carboxylic acid and a substantially water-immiscible organic solvent for the carboxylic acid, recovering the organic-solvent phase, intimately contacting the organic-solvent solution with an aqueous, water-soluble, relatively-strong acid, and recovering the aqueous phase (cf. application Serial No. 762,205, filed of even date herewith); (II) intimately contacting an aqueous solution of the antibiotic with a surface-active agent of the organically-substituted polybasic-inorganic acid type, recovering the precipitated salt-type combination of the antibiotic and the surface-active agent, and converting it into a water-soluble salt of the antibiotic (cf. application Serial No. 767,852, filed August 9, 1947, now Patent No. 2,537,934, dated January 9, 1951); and (III) intimately contacting an aqueous solution of the antibiotic with a surface-active agent of the organically-substituted polybasic-inorganic-acid type and a substantially water-immiscible organic solvent for soaps, recovering the organic solvent phase, and converting the salt-type derivative of the antibiotic therein into a water-soluble salt of the antibiotic (cf. application Serial No. 767,851, filed August 9, 1947, now Patent No. 2,537,933, dated January 9, 1951).

The invention may be variously otherwise embodied within the scope of the appended claims.

We claim:

1. The method which comprises interacting an antibiotic of the group consisting of streptomycin, dihydrostreptomycin, streptothricin, and water-soluble salts of these with a water-soluble salt of a substantially water-insoluble carboxylic acid in a solvent for the reactants.

2. The method which comprises interacting an antibiotic of the group consisting of streptomycin, dihydrostreptomycin, streptothricin, and water-soluble salts of these with a water-soluble salt of a substantially water-insoluble carboxylic acid in an aqueous medium.

3. The method which comprises interacting a water-soluble salt of streptomycin with a water-soluble salt of a substantially water-insoluble carboxylic acid in an aqueous medium.

4. The method of purifying an antibiotic of the group consisting of streptomycin, dihydrostreptomycin, streptothricin, and water-soluble salts of these which comprises treating an impure antibiotic of that group with a water-soluble salt of a substantially water-insoluble carboxylic acid in a solvent for the reactants, recovering the formed salt-type combination of the antibiotic and the carboxylic acid, and converting the latter combination into a water-soluble salt of the antibiotic.

5. The method of purifying an antibiotic of the group consisting of streptomycin, dihydrostreptomycin, streptothricin, and water-soluble salts of these which comprises treating an aqueous solution of an impure antibiotic of that group with a water-soluble salt of a substantially water-insoluble carboxylic acid, recovering the precipitated salt-type combination of the antibiotic and the carboxylic acid, and converting the latter combination into a water-soluble salt of the antibiotic.

6. The method of purifying streptomycin, which comprises treating an aqueous solution of an impure water-soluble salt of streptomycin with a water-soluble salt of a substantially water-insoluble carboxylic acid, recovering the precipitated salt-type combination of streptomycin and the carboxylic acid, and converting the latter combination into a water-soluble salt of streptomycin.

7. The method which comprises interacting a water-soluble salt of streptomycin with a water-soluble alkali salt of a higher fatty acid in an aqueous medium.

8. The method which comprises interacting a water-soluble salt of streptomycin with sodium laurate in an aqueous medium.

9. The method of purifying streptomycin, which comprises treating a primary streptomycin-containing liquid with a water-soluble salt of a substantially water-insoluble carboxylic acid, recovering the precipitated salt-type combination of streptomycin and the carboxylic acid, and converting the latter combination into a water-soluble salt of streptomycin.

10. The method of purifying streptomycin, which comprises treating a primary streptomycin-containing liquid with an activated charcoal, eluting the streptomycin from the charcoal with an aqueous, water-soluble mineral acid, treating the eluate with a water-soluble salt of a substantially water-insoluble carboxylic acid, recovering the precipitated salt-type combination of streptomycin and the carboxylic acid, and converting the latter combination into a water-soluble salt of streptomycin.

11. The method which comprises mixing an aqueous solution of a water-soluble salt of streptomycin with an aqueous solution of a water-soluble salt of a substantially water-insoluble carboxylic acid.

12. The method of purifying streptomycin, which comprises treating an aqueous solution of an impure water-soluble salt of streptomycin with a water-soluble salt of a substantially water-insoluble carboxylic acid, recovering the precipitated salt-type combination of streptomycin and the carboxylic acid, washing the latter combination with water, and converting it into a water-soluble salt of streptomycin.

13. The method which comprises treating an aqueous solution of a water-soluble salt of streptomycin having a pH of about 6.0 to about 8.0 with a water-soluble salt of a substantially water-insoluble carboxylic acid.

14. The method which comprises treating an aqueous solution of a water-soluble salt of streptomycin having a pH around 7.0 with a water-soluble salt of a substantially water-insoluble carboxylic acid.

15. The method which comprises interacting a member of the group consisting of streptomycin and water-soluble salts thereof with a water-soluble salt of a substantially water-insoluble fatty acid in a solvent for the reactants.

16. The method of purifying streptomycin which comprises treating an impure member of the group consisting of streptomycin and water-soluble salts thereof with a water-soluble salt of a substantially water-insoluble fatty acid in a solvent for the reactants, recovering the precipitated salt-type combination of streptomycin and the fatty acid, and converting the latter combination into a water-soluble salt of streptomycin.

17. The method which comprises mixing an aqueous solution of a water-soluble salt of streptomycin with an aqueous solution of a water-soluble salt of a substantially water-insoluble fatty acid.

18. The method of purifying streptomycin, which comprises treating an aqueous solution of an impure water-soluble salt of streptomycin with a water-soluble salt of a substantially water-insoluble fatty acid, recovering the precipitated salt-type combination of streptomycin and the fatty acid, washing the latter combination with water, and converting it into a water-soluble salt of streptomycin.

WILLIAM BRAKER.
WILLIAM A. LOTT.
ANDREW ELLIS O'KEEFFE.

REFERENCES CITED

The following references are of record in the file of this patent:

Fried et al.: Science, vol. 101 (1945), pages 613–615, 3 pages.
Kuehl et al.: Science, vol. 102 (1945), pages 34–35, 2 pages.
Kuehl et al.: JACS, vol. 68 (1946), pages 1460–1462.